C. A. Foster,
Combination Tool.
No. 102,105.                        Patented Apr. 19, 1870.

Witnesses.                          Inventor
Thos. H. Dodge                      Calvin A. Foster
Geo. H. Miller

United States Patent Office.

CALVIN A. FOSTER, OF FITCHBURG, MASSACHUSETTS.

Letters Patent No. 102,105, dated April 19, 1870.

IMPROVEMENT IN COMBINATION TOOL.

The Schedule referred to in these Letters Patent and making part of the same

*To all whom it may concern:*

Be it known that I, CALVIN A. FOSTER, of Fitchburg, in the county of Worcester and Commonwealth of Massachusetts, have invented certain new and useful Improvements in Combination Tools; and I do hereby declare that the following is a full, clear, and exact description of the same, reference being had to the accompanying drawings forming part of this specification, in which—

Figures 1, 2:
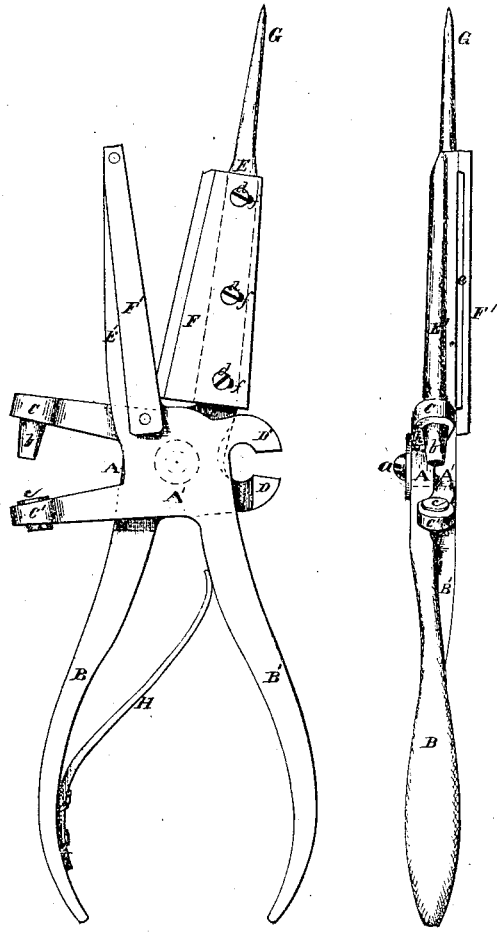
Figure 1 represents a side view.
Figure 2 represents a front view of my improved combination tool.

To enable those skilled in the art to which my invention belongs to make and use the same, I will proceed to describe it more in detail.

The nature of my invention consists in a combination tool comprising nippers, shears, punch, and awl, the parts being constructed and combined as shown and described.

In the drawings—

The parts marked A A' are the central disks, from which project the handles B B' and jaws C C', D D', and E E'.

The handle B and jaws C, D, and E are formed in one piece with the center disk A, and the handle B' and jaws C', D', and E', are formed in one piece with the center disk A', and the parts are pivoted together by a screw or rivet, *a*, which passes through the center of disk A, and is secured in the center of disk A', as indicated in the drawings.

The jaws C C' are arranged for punching, the upper one C being provided with a cutter, *b*, and the lower one C' with a face-plate, *c*, on which the edge of the cutter *b* descends.

The jaws D D' are arranged to be used as nippers, and their faces may be serrated or notched, to insure a firm hold, if desired.

The jaws E E' are arranged for shears, one, E, being provided with a cutter-blade, F, and the other, E', with a cutter-guard, F', between which latter and the jaw E' is a space, *e*, just sufficient to receive the blade F, and into which said blade passes as the jaws E E' are closed.

Slots *f* are formed in the cutter-blade F, through which pass the screws *d* that secure said cutter F to the jaw E, and, by loosening the screws *d*, the blade F may be set forward, to compensate for its wearing away in use.

The jaw E is prolonged beyond the cutter-blade F, and its extremity is rounded and pointed, to form an awl, G, as indicated in the drawings.

A spring, H, is attached to the handle B, which presses against the handle B', and thereby opens the jaws.

It will be seen from the foregoing description that my improved combination tool consists of nippers, shears, punch, and awl, combined in a very neat and substantial manner, and forming a tool which is well adapted to practical use in a great variety of operations, among a large class of artificers.

Having described my improved combination tool,

What I claim therein as new and of my invention, and desire to secure by Letters Patent, is—

The combination tool, consisting of the disks A A', handles B B', jaws C C', D D', and E E', and awl G, constructed and arranged substantially as described.

CALVIN A. FOSTER.

Witnesses:
THOS. H. DODGE,
GEO. H. MILLER.